J. P. SNEDDON.
TRACTOR WHEEL.
APPLICATION FILED DEC. 26, 1913.
1,150,398.
Patented Aug. 17, 1915.
2 SHEETS—SHEET 1.
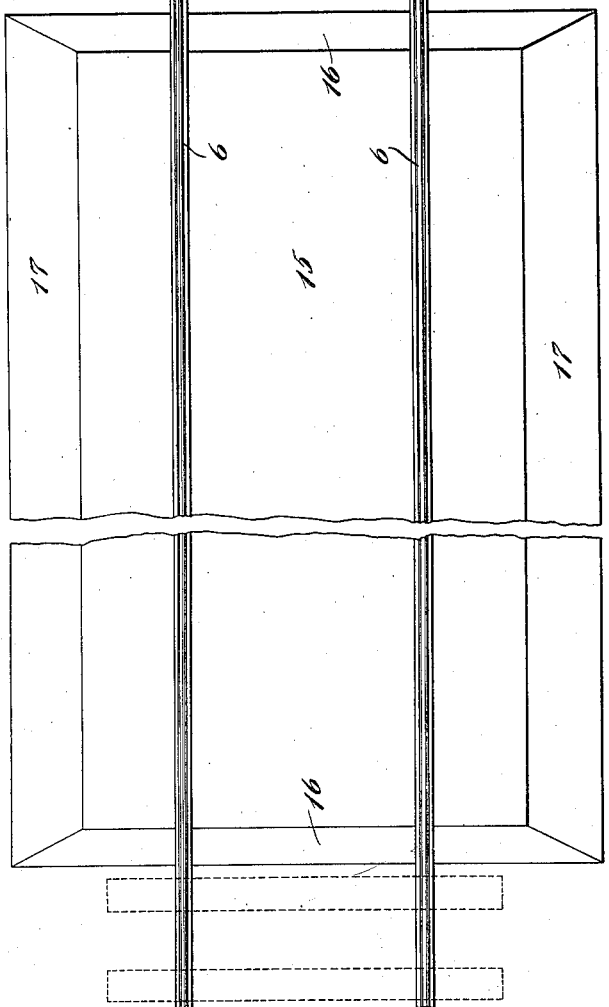
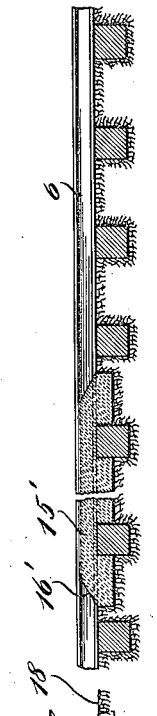
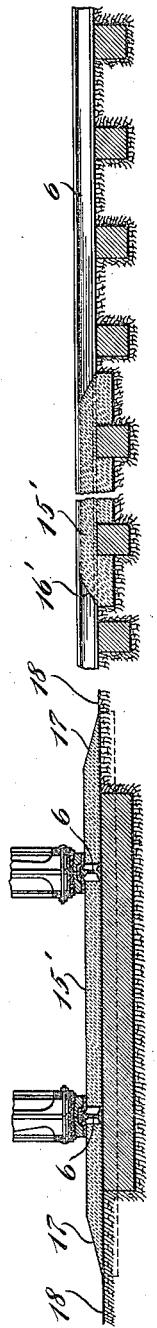
WITNESSES:
INVENTOR
James P. Sneddon
BY
his ATTORNEYS.

J. P. SNEDDON.
TRACTOR WHEEL.
APPLICATION FILED DEC. 26, 1913.
1,150,398.
Patented Aug. 17, 1915.
2 SHEETS—SHEET 2.
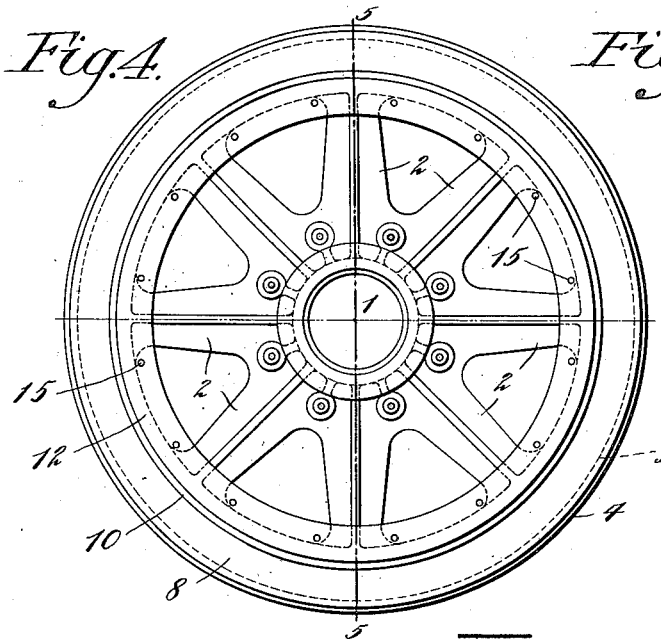
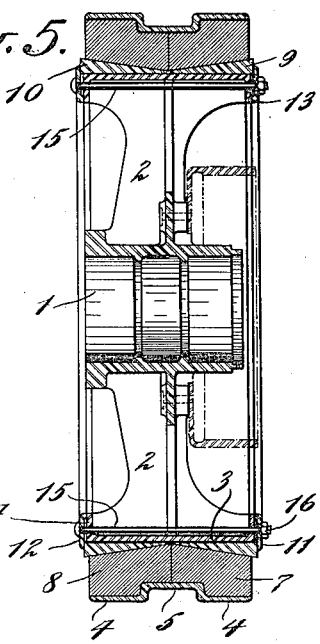
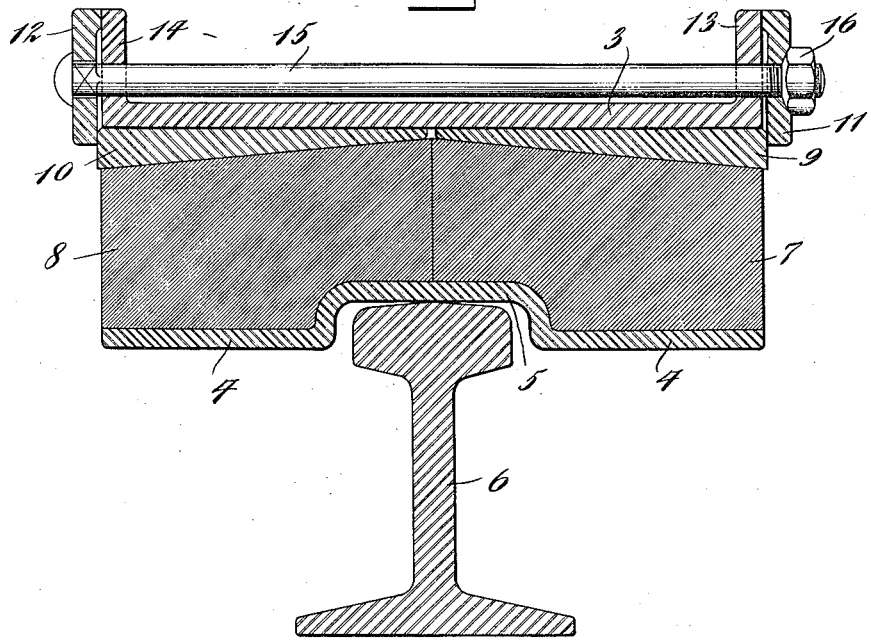
WITNESSES:
INVENTOR
James P. Sneddon
BY
Clifford Beel
his ATTORNEYS.

UNITED STATES PATENT OFFICE.

JAMES P. SNEDDON, OF BAYONNE, NEW JERSEY, ASSIGNOR TO THE BABCOCK & WILCOX COMPANY, OF BAYONNE, NEW JERSEY, A CORPORATION OF NEW JERSEY.

TRACTOR-WHEEL.

1,150,398.  Specification of Letters Patent.  Patented Aug. 17, 1915.

Application filed December 26, 1913. Serial No. 808,733.

*To all whom it may concern:*

Be it known that I, JAMES P. SNEDDON, a citizen of the United States, and residing at Bayonne, in the county of Hudson and State of New Jersey, have invented certain new and useful Improvements in Tractor-Wheels, of which the following is a specification.

My invention relates to a tractor wheel and has been designed more particularly for use on motor trucks to adapt the truck to be run on either a metal track or an ordinary roadway.

The object of the invention is the construction of a wheel for power tractors so that it may be used in the manner indicated, that is, one which will run on a standard gaged track or on an ordinary roadway, and which shall be capable of being easily placed on the track or derailed therefrom, and one having a rim and a tire which shall be durable under the conditions of service without excessive weight, and which shall possess sufficient elasticity for a tractor running at low speeds.

The invention will be understood by reference to the acccompanying drawings in which,—

Figures 1, 2 and 3 are, respectively, a transverse section, a longitudinal section and a plan of a roadbed at a turn-off section thereof; a portion of the wheels of a tractor being shown in Fig. 1; Fig. 4 is a side view of the wheel; Fig. 5 a section on the plane of the line 5—5 of Fig. 4; and Fig. 6 an enlarged section through the peripheral portions of the wheel showing the manner of clamping the tire to the rim.

Similar reference numerals indicate similar parts in the several views.

Referring to Figs. 4, 5 and 6 the numeral 1 designates the hub of the wheel and 2 the spokes, the latter being secured to the hub and to the rim or felly 3 in any suitable manner. The tire, preferably of steel, has substantially the same width as the rim 3 and is formed with surface tread sections 4, and an intermediate rail-receiving groove or tread section 5 of less diameter than the surface sections. The tread section 5 is formed as a circumferential recess or groove adapted to the particular rail used. As shown, it is of slightly greater width than the width of the head of a standard rail 6, and its depth less than the height of the head of the rail. The surface sections 4 of the tire adapt the wheel to run on an ordinary roadway when the tractor is derailed, as hereinafter explained.

Within the tire 4 are placed two symmetrical backing rings 7 and 8, preferably of wood, the outer faces of which are made to conform to the tire, and the inner faces of which are inclined upwardly from the sides of the wheel to the central plane thereof. The tire 4 with the wood rings 7 and 8 are then placed so as to surround the rim 3, and are secured thereto by wedge blocks or rings 9 and 10 driven in from both sides. To prevent displacement of the wedge blocks or plates and of the wood rings, I clamp them to the wheel by side rings 11 and 12 through which, and through openings in flanges 13 and 14 of the rim 3, is passed a screw bolt 15 adapted to receive a tightening nut 16. The rings 11 and 12 bear against the flanged sides of the rim 3, and the ends of the wedges 9 and 10.

A tractor having wheels formed with a tire as above described, that is with outside flat or surface tread sections adapted to run on an ordinary roadway, and an intermediate grooved tread section 5, adapted to run on a standard rail and to maintain the tractor on the rails, may be advantageously used where the yard conditions make it necessary or desirable. Such use, however, requires that the roadbed be constructed with a turn-off such as shown in Figs. 1, 2 and 3. In these figures I have shown a portion of a standard roadbed with rails and ties, the base of the rails being substantially level with the roadway 18. To permit the tractor to be run on the rails or to be demounted therefrom so as to run on an ordinary roadway, I surround the rails at such points at which it may be desirable to turn it, with a concrete or other substantial type of paving 15, the upper surface of the paving or platform being substantially flush with the top of the rails. The ends 16 and sides 17 of the platform are inclined downward from the upper surface so that when the tractor approaches one of these sections from an ordinary roadway, and it is desired that it shall take the rails, the tractor is run up the inclined sides 17 and the wheels properly placed over the rails. As the tractor is run off over the end of the platform it is gradually lowered until the tread sections 5 of the wheels rest upon the rails, as shown in Fig. 6. When the tractor is to be derailed it is run up the inclined end of the platform and thereby gradually raised and lifted off the rails until the surface tread sections 4 rest upon the platform, when the tractor may be run off over one of the inclined sides 17. In other words the turn-off section 15 performs the function of a switch which enables the tractor to take the rails, or to be derailed so as to run on an ordinary roadway. This is of great advantage where the yard conditions require the transportation of heavy parts, and it has been found useful in facilitating the work of the yard.

What I claim and desire to secure by Letters Patent of the United States is:—

1. A wheel comprising a tire having tread sections of different diameters, a backing for the tire having its outer face conforming to the tread and its inner face inclined from the sides of the wheel toward the central plane thereof, and wedge pieces to secure the tire and backing to the felly.

2. A wheel comprising a tire having tread sections of different diameters, a backing for the tire, wedge blocks inserted between the backing and the felly, and clamping rings on the sides of the wheel bearing against said wedge blocks and the felly.

In testimony whereof I have hereunto signed my name in the presence of two subscribing witnesses.

JAMES P. SNEDDON.

Witnesses:
  A. N. LOWES,
  H. C. INSLEE.